United States Patent [19]
McCray

[11] Patent Number: 5,921,528
[45] Date of Patent: Jul. 13, 1999

[54] HIGH PRECISION HIGH FLOW RANGE CONTROL VALVE

[75] Inventor: John A. McCray, Idaho Falls, Id.

[73] Assignee: Lockheed Martin Idaho Technologies Company

[21] Appl. No.: 08/804,993

[22] Filed: Feb. 25, 1997

[51] Int. Cl.[6] .................................................. F16K 5/10
[52] U.S. Cl. ........................................ 251/208; 251/205
[58] Field of Search .................................. 251/205, 208, 251/318, 319, 210, 264

[56] References Cited

U.S. PATENT DOCUMENTS

| | | | |
|---|---|---|---|
| 1,362,302 | 12/1920 | Hansen et al. | 251/208 X |
| 1,999,921 | 4/1935 | Burkhardt | 251/205 X |
| 3,093,159 | 6/1963 | Royle | 251/208 X |
| 3,514,074 | 5/1970 | Self | 251/205 X |

Primary Examiner—Kevin Lee
Attorney, Agent, or Firm—Wells St John Roberts Gregory & Matkin

[57] ABSTRACT

A fluid control valve is described having a valve housing having first and second valve housing openings for the ingress and egress of fluid through the control valve. Disposed within a void formed by the control valve is a sleeve having at least one sleeve opening to permit the flow of fluid therethrough. A flow restricter travels within the sleeve to progressively block off the sleeve opening and thereby control flow. A fluid passageway is formed between the first valve housing opening and the outer surface of the sleeve. A second fluid passageway is formed between the inside of the sleeve and the second valve housing opening. Neither fluid passageway contains more than one 90° turn. In the preferred embodiment only one of the two fluid passageways contains a 90° turn. In another embodiment, the control valve housing is bifurcated by a control surface having control surface opening disposed therethrough. A flow restricter is in slidable contact with the control surface to restrict flow of fluid through the control surface openings.

23 Claims, 10 Drawing Sheets

HIGH PRECISION HIGH FLOW RANGE CONTROL VALVE

CONTRACTUAL ORIGIN OF THE INVENTION

The United States Government has rights in this invention disclosed under contract number DE-AC07-84ID12435 between the U.S. Department of Energy and Westinghouse Idaho Nuclear Company, now contract number DE-AC07-94ID13223 with Lockheed Idaho Technologies Company.

TECHNICAL FIELD

This invention pertains to control valves, particularly control valves having high range and high precision.

BACKGROUND OF THE INVENTION

Control valves are used to control the flow of fluids in many processes. They can be used to control the flow of raw materials and finished product to and from process vessels; they can be used to control the flow of hydraulic fluid in hydraulic control mechanisms; they can be used in a wide range of other applications including municipal water supplies and natural gas supplies, and chemical processes. Control valves operate by means of a control mechanism which moves a restricting device within a control valve housing. By restricting the flow through the control valve, a pressure drop occurs and the flow of fluid is reduced. In many applications it is desirable to have a control valve where no restriction occurs when the valve is in a full open position. Additionally, since the control valve is responsive to a control mechanism, it is desirable to have a control valve which is not overly sensitive to inputs from the control mechanism. (An overly sensitive control valve will give an undesirably large change in pressure drop in response to a small input from the control mechanism.) In many applications it is also desirable to be able to control the flow with a high precision, such as within 1% or less of the total flow range. Due to their inherent design, most prior art control valves of this type have inherent flow restrictions, even when the valve is in a full open position. Further, many of the prior art control valves are restricted to controlling the flow across a dimension no larger than the inlet or outlet diameter of the control valve which is directly related to the diameter of the respective pipe or tube through which the fluid flows to the valve. This limitation on the control distance has a direct impact on either the flow range or the precision to which flow may be controlled using the control valve.

It is therefore an object of this invention to produce a control valve having both high range and high precision.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The present invention describes a control valve designed so as to have a high flow range and capable of precise flow control, i.e., high precision. The control valve includes a valve housing having two openings, one opening for fluid inlet and one opening for fluid outlet. Although the valve housing openings may be referred to hereinafter as "a first housing opening" and "a second housing opening", there is no restriction on which opening should be associated with fluid inlet and which opening should be associated with fluid outlet. Within a void formed by the valve housing is a structural element, typically a sleeve or a plate, which acts as a control surface for the control of fluid flowing through the valve housing. The control surface contains openings to allow fluid to pass therethrough. A flow restricter is in slidable or movable contact with the control surface to restrict flow of the fluid through the openings in the surface and therefore the flow of fluid through the valve, thus performing the control valve functions of the present invention. The control valve is designed so as to minimize the obstructions between ingressing and egressing flow, thus allowing for the control valve to operate over the full range of incoming flow. The control surface is preferably sized to allow movement of the flow restricter over a long distance relative to the first and second housing openings, thus allowing for more precise control of flow through the control valve.

Figure 1:
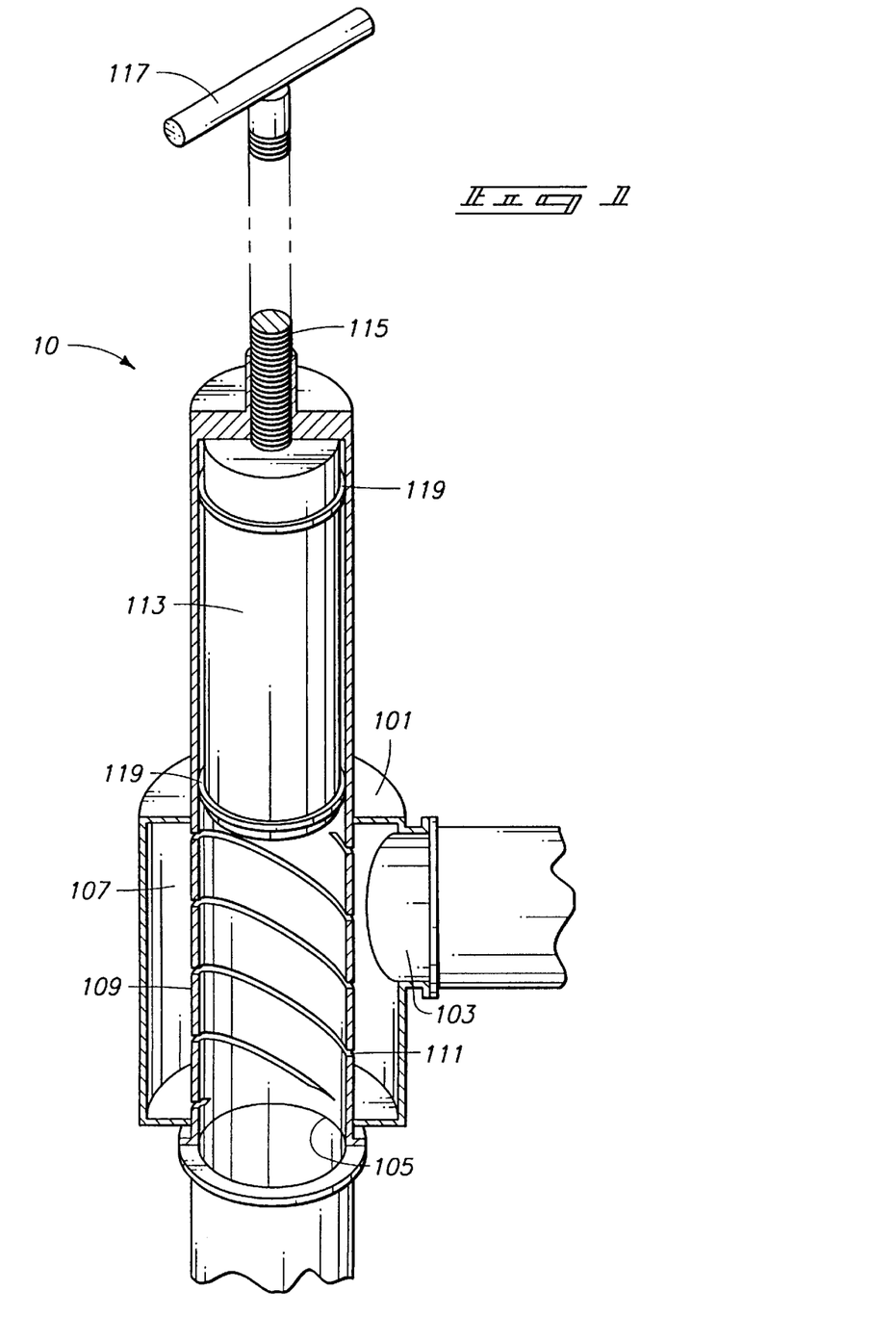
FIG. 1 is an oblique sectional view of a control valve according to the preferred embodiments of the invention.

Turning now to FIG. 1, a control valve 10 of the present invention is shown. The control valve has a valve housing 101, a first housing opening 103, and a second housing opening 105. As discussed above, the first and second housing openings 103 and 105 can either act in the capacity of flow inlets or flow outlets. The valve housing 101 forms a void 107. Disposed within the void 107 is a sleeve 109. The sleeve 109 forms the control surface through which fluid flow will be controlled. The sleeve contains a sleeve opening 111 through which fluid passes from one of the valve housing openings through and to the other valve housing opening. The sleeve openings 111 are contained in a section of the sleeve disposed within the void of the valve housing 101 over a length which will be defined as the control length. The control length is essentially that length of the sleeve over which there are openings for fluid to pass through and through which fluid restriction may be obtained by a flow restricting element acting within the sleeve. Disposed within one end of the sleeve 109 is a flow restricter 113. The flow restricter 113 is situated such that it may move within the defined control length of the sleeve and block sleeve openings 111, thereby restricting flow through the control valve 10. The flow restricter 113 is connected to a drive stem 115 which is connected to an actuator which may be a hand actuator 117 or may be an automatic controller (not shown). While the drive stem is shown in the figures as being threadably engaged in the housing, this is not a requirement, and the stem may be slidably mounted as well. The flow restricter may further be fitted with seals 119 which assure a blockage of fluid within the sleeve as a result of flow restricter movement over sleeve openings 111.

A first fluid passageway is formed between the first housing opening 103 and the sleeve openings 111. Fluid moving within the first fluid passageway may pass between opening 103 and sleeve openings 111 without making more than one 90° turn in so doing. In fact, as shown in FIG. 1, the flow path between first housing opening 103 and at least one portion of the sleeve openings 111 is an essentially straight line having no turns. A second fluid passageway is formed between sleeve openings 111 and the second housing opening 105. Fluid moving within the second fluid passageway between sleeve opening 111 and housing opening 105 makes no more than one 90° turn in so doing. As a result of the minimal number of directional changes imposed upon fluid moving through the fluid passageway in the control valve, and as a further result of the minimal number of components within the flow path formed between openings 103 and 105, a minimal loss of energy is imposed on fluid moving through the control valve as a result of the inherent design of the valve (as opposed to energy loss intentionally imposed using flow restricter 113). Some fluid entering first opening 103 will make more than one ninety degree turn prior to entering opening 111 (for example, fluid entering opening 111 at the side of the housing distal from opening 103, or fluid entering opening 111 proximate to the opening 105). However, an important distinction over the prior art is that there is only one fluid passageway between opening 103 and sleeve opening 111 at the first side of sleeve 109, and only one fluid passageway between opening 105 and sleeve opening 111 at the second side of sleeve 109, and no intervening fluid passageways.

In the preferred embodiment the length of area of the sleeve over which control is governed is longer than either the diameter of the first opening 103 or diameter of the second opening 105.

Figure 2:
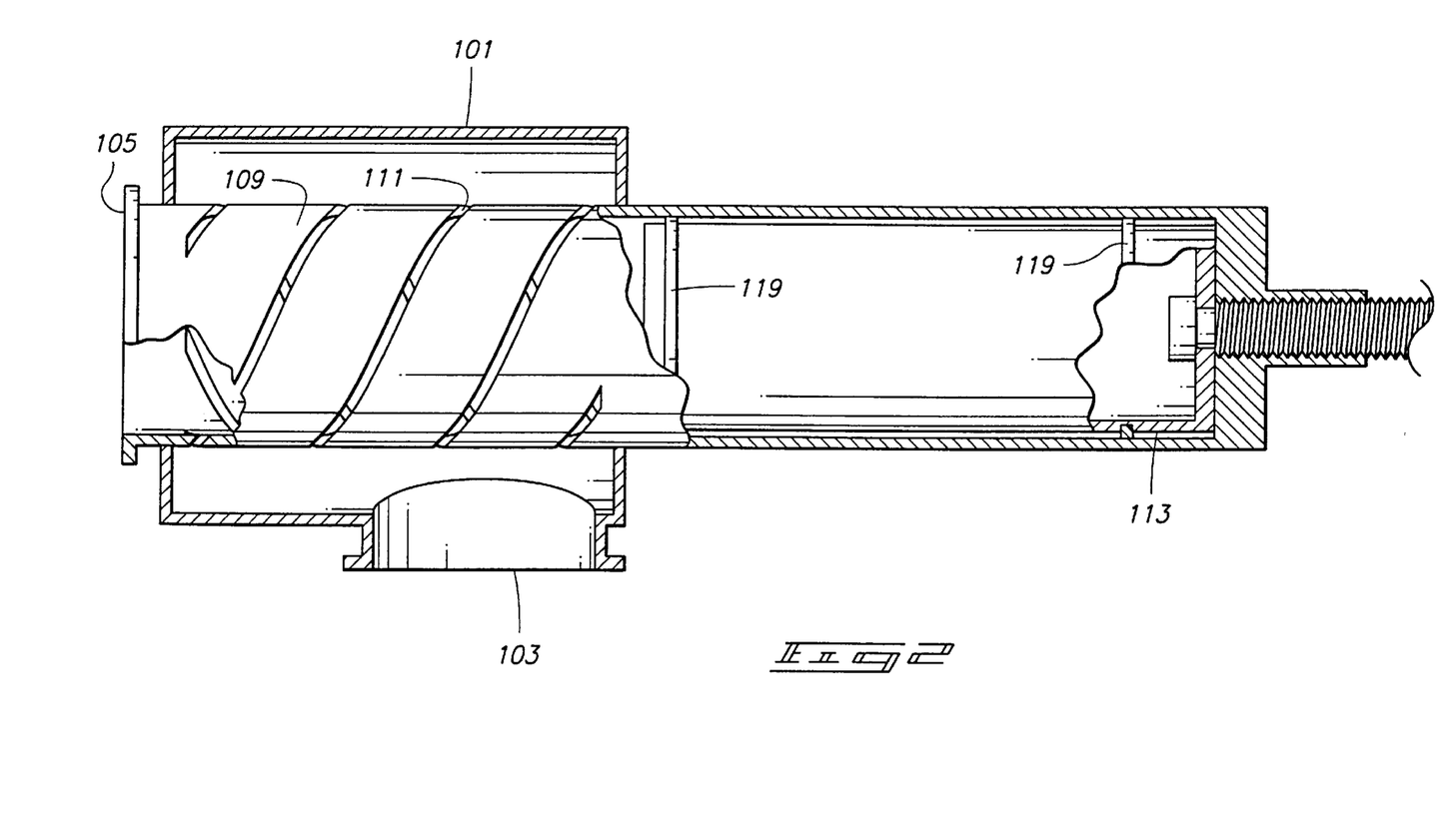
FIG. 2 is a cross-sectional view of the control valve of FIG. 1.

Turning now to FIG. 2, a cross-sectional view of the control valve of FIG. 1 is shown. It can be seen that the flow restricter 113 comprises a sleeve which is concentric with sleeve 109 and slides within sleeve 109. Flow restricter 113 may alternately be a solid plug which moves within sleeve 109.

Figure 3:
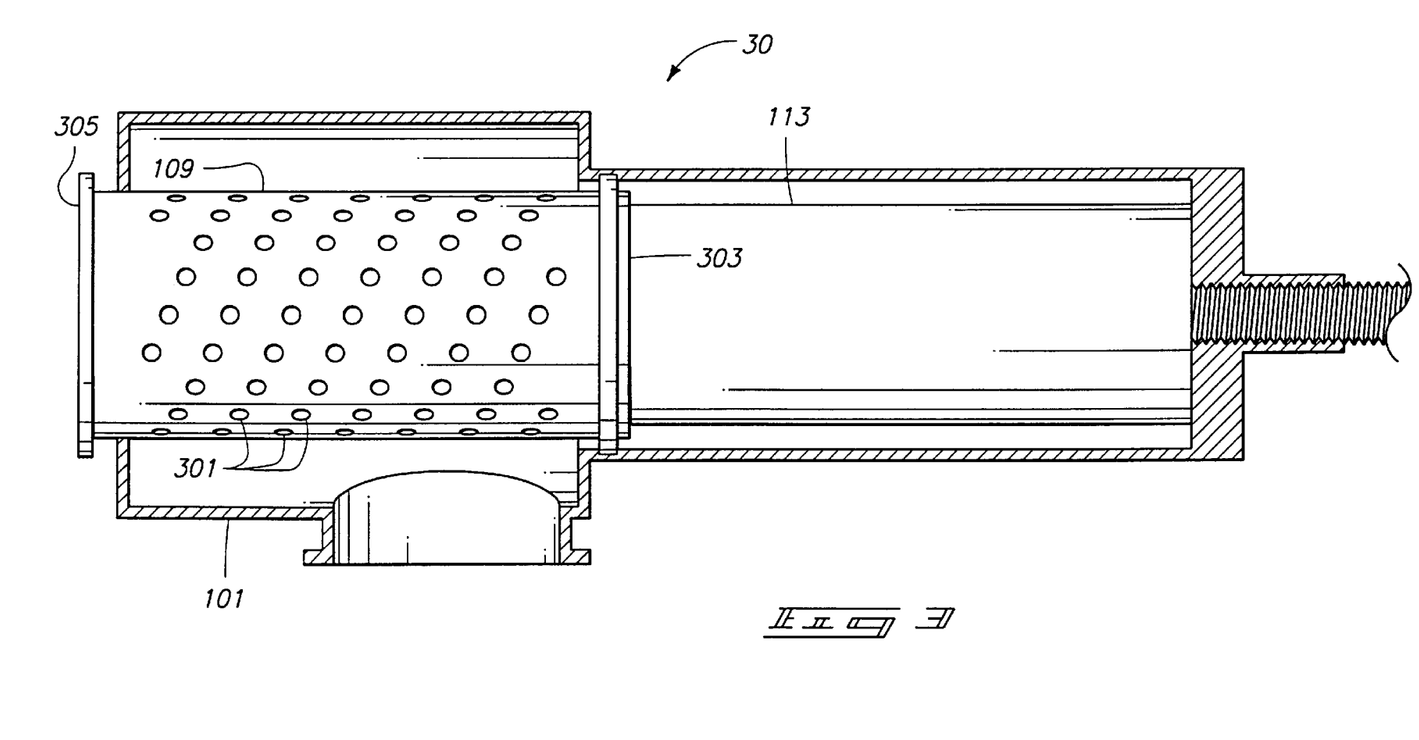
FIG. 3 is a cross-sectional view of the control valve of FIG. 1 showing an alternate embodiment for the sleeve openings.

Referring now to FIG. 3, the openings in sleeve 109 can be a series of holes 301 deployed in a helical pattern about the sleeve. As in FIG. 2, flow restricter 113 slides within sleeve 109 progressively blocking off holes 301 thereby restricting flow of fluid through the control valve 30. As in FIG. 2, the flow restricter can be either a sleeve or a solid plug. Holes 301 may be holes all having the same diameter, or they may have differing diameters. One reason for selecting differing diameters of holes 301 would be to provide a predetermined flow restriction in response to linear travel of flow restricter 113. For example, if larger diameter holes were used for holes at a first end 303 of sleeve 109, and progressively smaller holes were used approaching the second end 305 of the sleeve, then in response to linear travel of flow restricter 113, a large flow restriction would occur as a result of movement of the flow restricter at the outset of movement at end 303, progressively reducing to less flow restriction in response to linear movement of flow restricter 113 as flow restricter approaches end 305 of sleeve 109.

Figure 4:
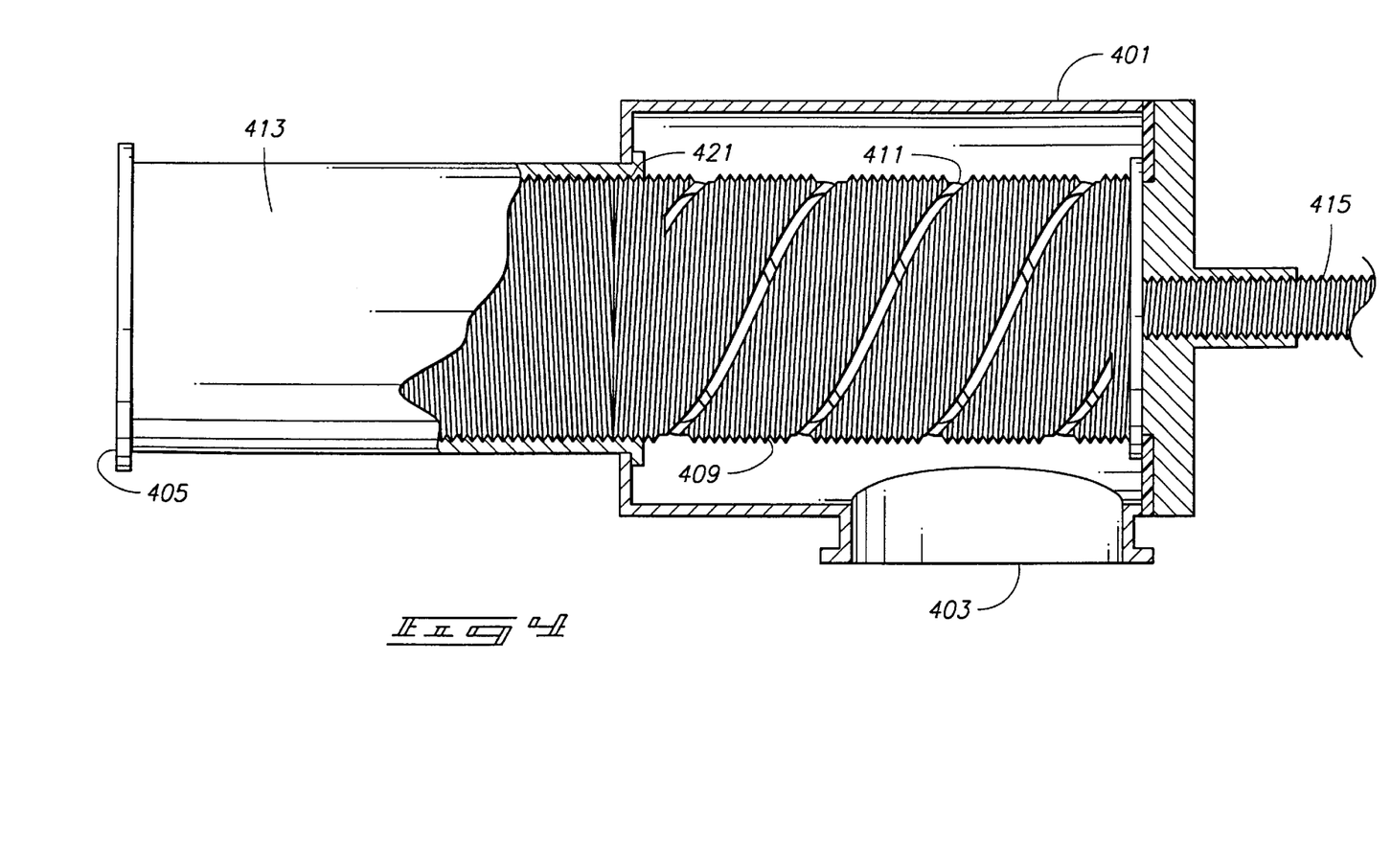
FIG. 4 is a cross-sectional view of an alternate embodiment of the invention showing an externally threaded sleeve.

Turning now to FIG. 4, an alternate embodiment of the invention is shown wherein sleeve 409 having sleeve openings 411 moves inside of a second sleeve 413. Second sleeve 413 acts as the flow restricter in this embodiment of the invention. As drive stem 415 is rotated, sleeve 409 threadably engages sleeve 413 and travels into sleeve 413. As sleeve 409 travels into sleeve 413, threads 421 progressively block off sleeve openings 411, thereby reducing flow of fluid through sleeve 409 and through valve openings 403 and 405. It should be noted that fluid can flow either from opening 405 through sleeve 409 and out through opening 403, or into opening 403 and out through opening 405. It should be understood that with respect to FIG. 4 the sleeve openings 411 may be of any form including holes as shown at 301 in FIG. 3 or other shapes of openings such as slots running parallel to the axis of the sleeve 409.

Turning to FIG. 2, it can be seen that sleeve 109 is stationary with respect to valve housing 101. Looking at FIG. 4, it can be seen that sleeve 409 is not stationary with respect to valve housing 401. Thus, the valve sleeve may either be stationary or movable with respect to the valve housing and still achieve the same effect of obtaining control over a distance longer than either valve housing opening. In addition, looking at FIG. 2 which shows a flow restricter 113 being in the shape of a sleeve concentric with and disposed inside of sleeve 109, but the same effect can be achieved by having a flow restricter in the form of a sleeve which is slidably disposed about the outer surface of sleeve 109. An embodiment wherein the flow restricter is a sleeve concentric with and sliding about the outer surface of sleeve 109 is not shown, although it is within the ability of one skilled in the art to modify the valve of FIG. 2 to accommodate a flow restricter comprising an external sleeve to sleeve 109.

Figure 5:
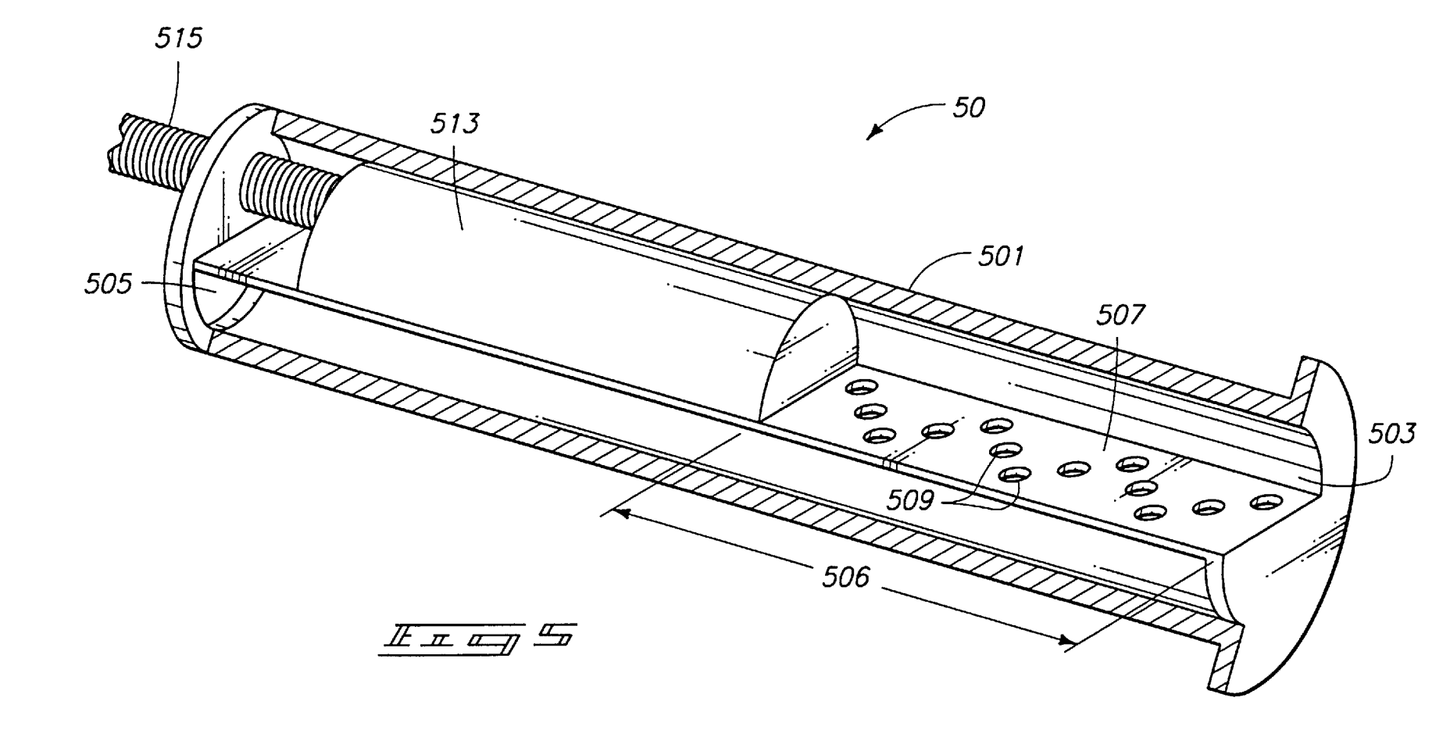
FIG. 5 is an isometric view of an alternate embodiment of the invention showing a control valve with a bifurcated chamber.

Turning now to FIG. 5, an alternate embodiment of the invention is shown. The fluid control valve 50 of FIG. 5 comprises a valve housing 501 having a first housing opening 503 and a second housing opening 505. The valve housing 501 is configured so as to provide a valve control length 506 over which fluid flowing through the control valve may be controlled. It will be noted that control length 506 is longer than the major dimension of either first housing opening 503 or second housing opening 505. While not a requirement, this is the preferred embodiment. The void formed by the valve housing 501 is bifurcated into two portions by planar control surface 507. First housing opening 503 is in direct fluid communication with the first bifurcated portion of the valve housing 501, while second housing opening 505 is in direct fluid communication with the second bifurcated portion of valve housing 501. The planar control surface 507 has at least one control surface opening 509 disposed therethrough allowing fluid to be communicated between the two bifurcated portions of the valve housing. The control surface opening is disposed within that portion of the planar control surface which makes up the control length 506 of the control valve. Fluid flows through valve 50 by entering valve housing opening 503. The fluid then passes through control surface opening 509 in the planar control surface, and then exits through second housing opening 505. It will be noted that fluid can flow in the opposite direction as well.

Disposed within the void formed by the valve housing 501 is flow restricter 513 which is in slidable contact with control surface 507 such that as flow restricter 513 moves within the first bifurcated portion of the valve housing control surface, openings 509 are progressively blocked off, thus restricting flow of fluid through the valve housing. Flow restricter 513 moves in response to activation of drive stem 515 which may either be threadably mounted to valve housing 501 or slidably mounted. Drive stem 515 may be further connected outside of the valve housing to an automatic or a manual control valve controller (not shown). Although shown as a semicylindrical block in FIG. 5, flow restricter 513 can alternately be a metal plate in slidable contact with control surface 507.

The control valve of FIG. 5 is configured such that a first fluid passageway is formed between first housing opening 503 and control surface openings 509. Fluid moving within the first fluid passageway makes no more than one 90° turn in so doing. A second fluid passageway is also formed in the control valve between second housing opening 505 and control surface opening 509. Fluid moving within the second fluid passageway also makes no more than one 90° turn in so doing. In this way a minimal pressure loss is incurred as a result of the inherent internal design of the control valve.

In the preferred embodiment of FIG. 5, the cumulative area of all control surface openings 509 is at least equal to the larger of the two valve housing openings 503 and 505.

Figure 8:
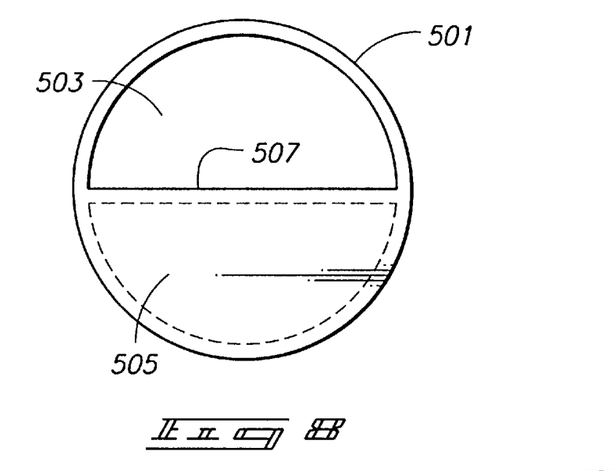
FIG. 8 is a cross-sectional view of the control valve of FIG. 5.
Figure 9:
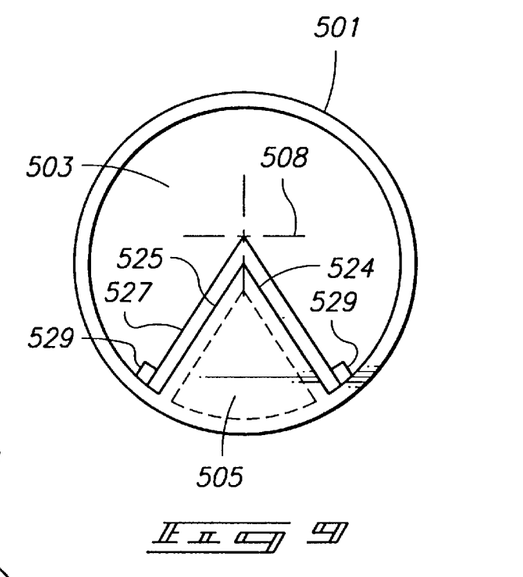
FIG. 9 is a cross-sectional view of an alternate embodiment of the control valve of FIG. 5.

In the preferred embodiment, the valve housing 501 is a cylindrical housing and may be made of pipe. While a flat planar control surface 507 is shown, it should be understood that the control surface may be of a contoured shape. For example, FIG. 8 shows a cross section of the control valve of FIG. 5. A similar cross section for an alternate embodiment of the control valve of FIG. 5 is shown in FIG. 9. In FIG. 9 the control surface is comprised of two individual flat control surfaces 524 and 525. Control surfaces 524 and 525 are flat planar control surfaces which intersect along a common line which is parallel to the central axis 508 of the cylindrical valve housing 501. Flow restricter 527 is an inverted V-shaped plate in slidable contact with the intersecting control surfaces 525 and 524. The flow restricter is held in slidable contact with the control surface by flow restricter guides 529. Fluid enters the control valve of FIG. 9 through first housing opening 503 and passes through openings (not shown) in control surfaces 524 and 525 and exits through second housing opening 505. As stated before, flow may also pass through the control valve in the opposite direction.

Figure 10:
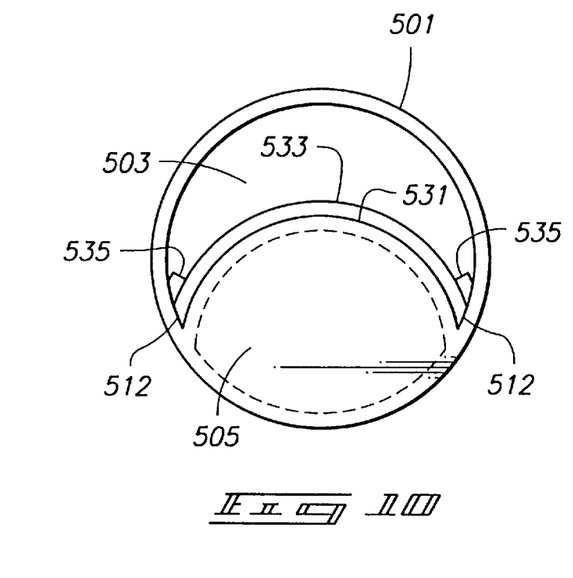
FIG. 10 is a cross-sectional view of an alternate embodiment of the control valve of FIG. 5.

A further embodiment of the control valve of FIG. 5 is shown in cross-section in FIG. 10 wherein the control surface 531 comprises an arcuate surface having side edges 512 in contact with the sides of valve housing 501. In this embodiment the flow restricter comprises an arcuate plate 533 in slidable contact with control surface 531. Flow restricter 533 is held in slidable contact with surface 531 by guides 535. Fluid entering the control valve of FIG. 10 enters through first housing opening 503, passes through control surface openings in control surface 531, and exits the control valve through second housing opening 505. Reverse flow may also occur.

Figure 6:
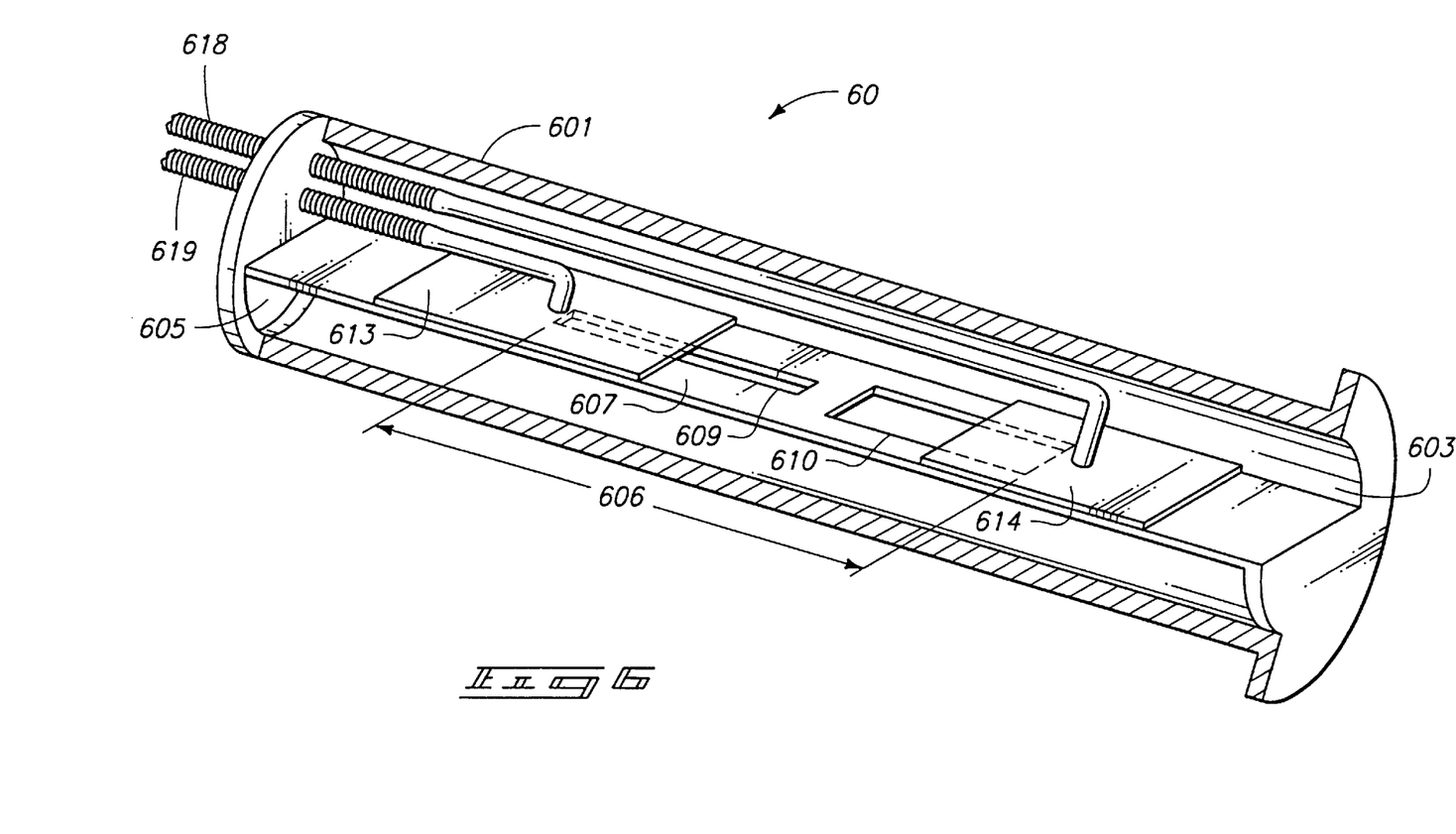
FIG. 6 is an alternate embodiment of the control valve of FIG. 5 showing two control elements.

FIG. 6 shows an alternate version of the control valve of FIG. 5. In the control valve 60 of FIG. 6, two control surface openings 609 and 610 are disposed within planar control surface 607, and are further disposed over control length 606. As shown in FIG. 6, one control surface opening (610) may be larger than the second control surface opening (609).

The first control surface opening 610 has associated flow restricter 614 which moves over opening 610 in response to movement of drive stem 618. Control surface opening 609 has associated flow restricter 613 which slides over opening 609 in response to movement from drive stem 619. Fluid flowing through the first housing opening 603 into the first bifurcated portion of valve housing 601 may flow through either opening 609 or 610, depending on which flow restricter 607 or 614 is open and how far the flow restricter is open. For example, the embodiment of FIG. 6 would allow opening 610 to be fully opened thus allowing a major portion of fluid flow to pass through the valve. Finer control of fluid passing through the control valve may then be obtained by movement of flow restricter 613. Fluid passing through control openings 609 and 610 exits the control valve through second housing opening 605. As stated before in earlier embodiments, fluid may also flow from housing opening 605 through control openings 609 and 610 and out through housing opening 603.

Figure 7:
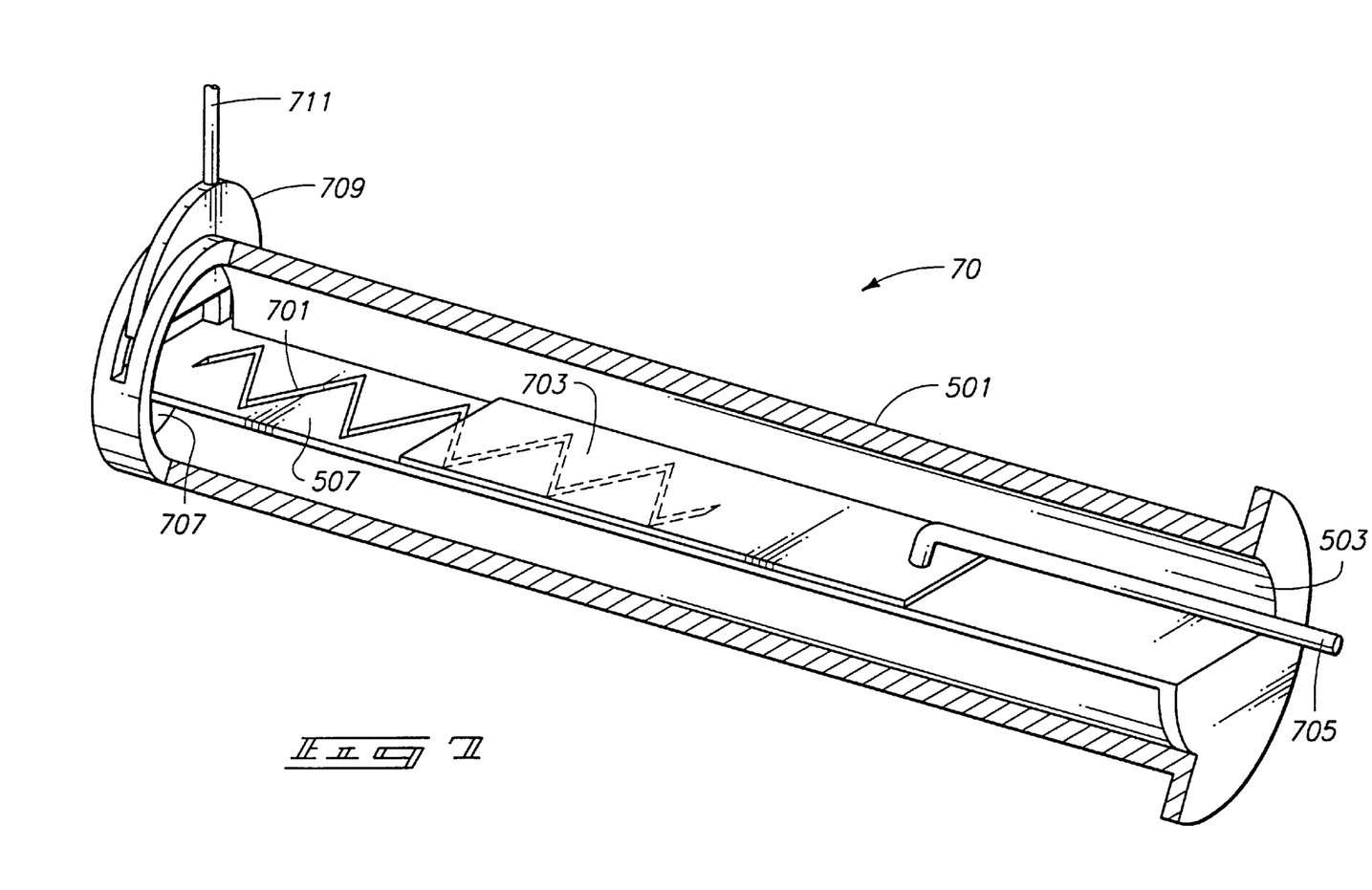
FIG. 7 is an alternate embodiment of the control valve of FIG. 5 showing two elements.

Yet another embodiment of the control valve of FIG. 5 is shown at FIG. 7. The control valve 70 of FIG. 7 resembles that of the control valve of FIG. 6 in that a second opening is provided, and thereby fine incremental control over a particular selected range may be controlled by using a second fine control flow restricter. With respect to FIG. 7, the control valve housing 501 is bifurcated into two portions by planar control surface 507. A control surface opening 701 is disposed within control surface 507. Flow restricter 703 is in slidable contact with control surface 507 such that in response to inputs from drive stem 705 the control surface 703 will move over control surface opening 701 thus restricting flow. Valve 70 contains a third valve housing opening 707. Opening 707 may be progressively blocked by second flow restricter 709 which acts in response to inputs to second drive stem 711. When second flow restricter 709 is in an open position, fluid may pass from the first bifurcated portion of the valve housing through opening 707 and thus avoid having to pass through opening 701. In this manner a significant portion of fluid may be permitted to pass through the valve housing allowing for a fine control of the remaining portion by use of flow restricter 703 over opening 701.

The control surface openings (for example, 509 in FIG. 5 and 701 in FIG. 7) can be shaped so as to provide a known fluid throughput in response to predetermined positions of the flow restricter (513 and 703 respectively). The control surface openings may be configured for example to provide 75% of the flow through the control valve within the first 25% of the flow restricter travel. This allows for the remaining 25% of the flow to be controlled over 75% of the control length 506 of FIG. 5. Such a configuration would allow for very precise control of the remaining 25% of flow to be obtained due to the relatively large distance over which control may be achieved.

Figure 11:
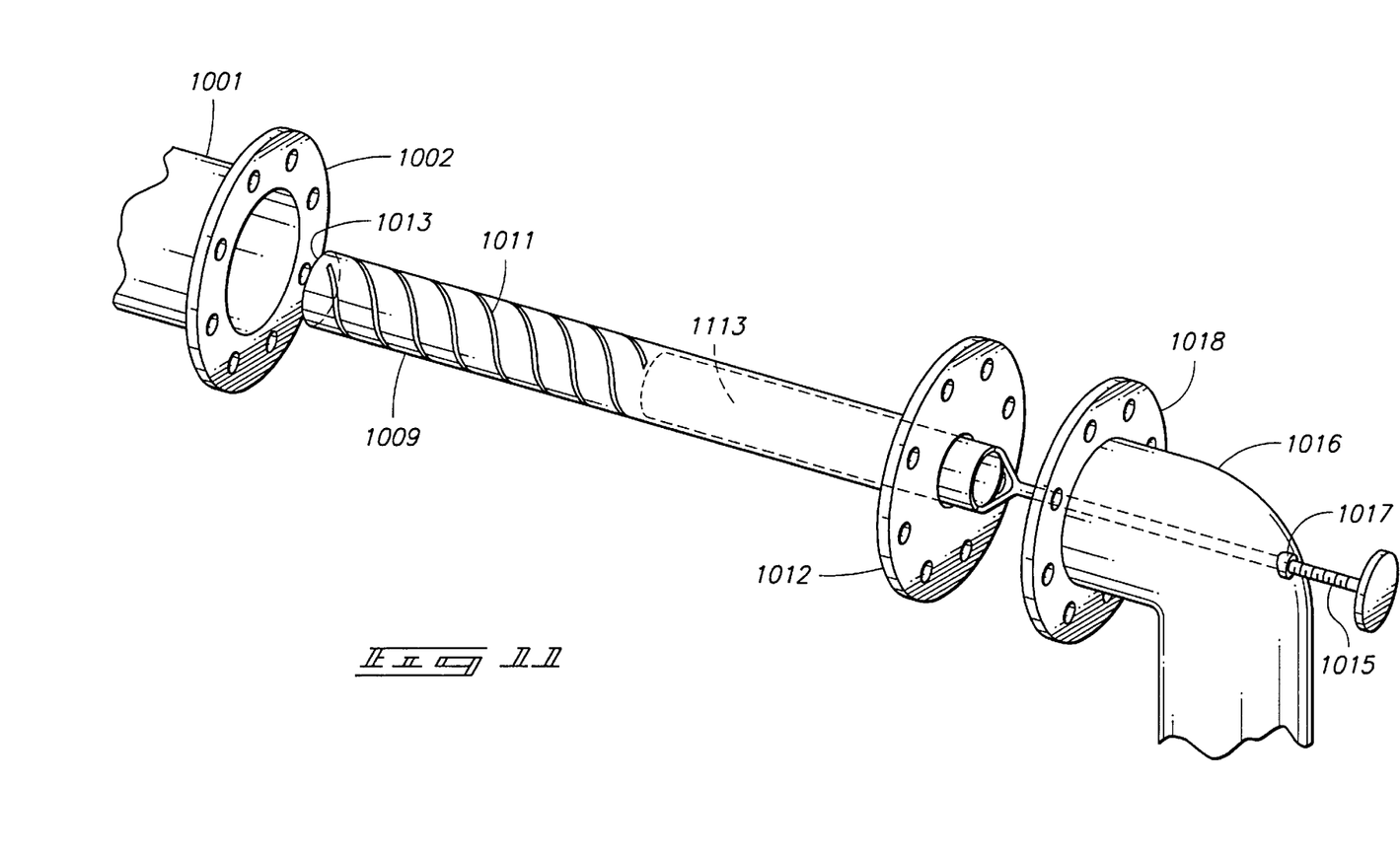
FIG. 11 is an isometric view showing an alternate embodiment of the control valve of the type shown in FIG. 2 which is assembled by inserting a control valve insert into a pipe.

Apparatus of the present invention may be implemented by retrofitting an existing pipe connection as follows. In a piping system where a straight run of process piping terminates at an elbow and the pipe and elbow are connected by pipe fittings which may be disconnected without destructive means, preferably where the pipe connection is a flange, the pipe connection is broken and a control valve element is inserted into the process pipe. A modified elbow is then reconnected in place of the old elbow and a control valve as described herein is thus created. Specifically, with respect to FIG. 11, a control valve of the type shown in FIG. 2 is created by breaking the pipe connection between the pipe 1001 and the elbow (not shown) at the pipe flange 1002. A control valve element which consists of the pipe sleeve 1009 which is connected to pipe fitting 1012, here shown as a flange, has an opening to allow fluid to flow into the inside of the sleeve 1009. The sleeve has a closed end 1013 and control valve openings 1011. Disposed within the sleeve is a flow restricter 1113, which consists of a hollow sleeve in moveable, sealed contact with the inside surface of sleeve 1011. Drive stem 1015 is connected to sleeve 1113 and protrudes through the modified elbow 1016 at opening 1017. The completed valve is assembled by inserting the control valve insert into pipe 1001 and then connecting pipe fittings 1002, 1012, and 1018 thus completing a sealed valve. Fluid flows into elbow 1016 and into sleeve 1009, out of opening 1011 and into pipe 1001. The area between sleeve 1009 and the inside diameter of pipe 1001 comprises the valve housing void. It should be noted again that fluid entering sleeve 1009 makes a single 90° turn as it enters openings 1011, and makes a single 90° turn after exiting openings 1011 and turning to head downstream in pipe 1001.

Figure 12:
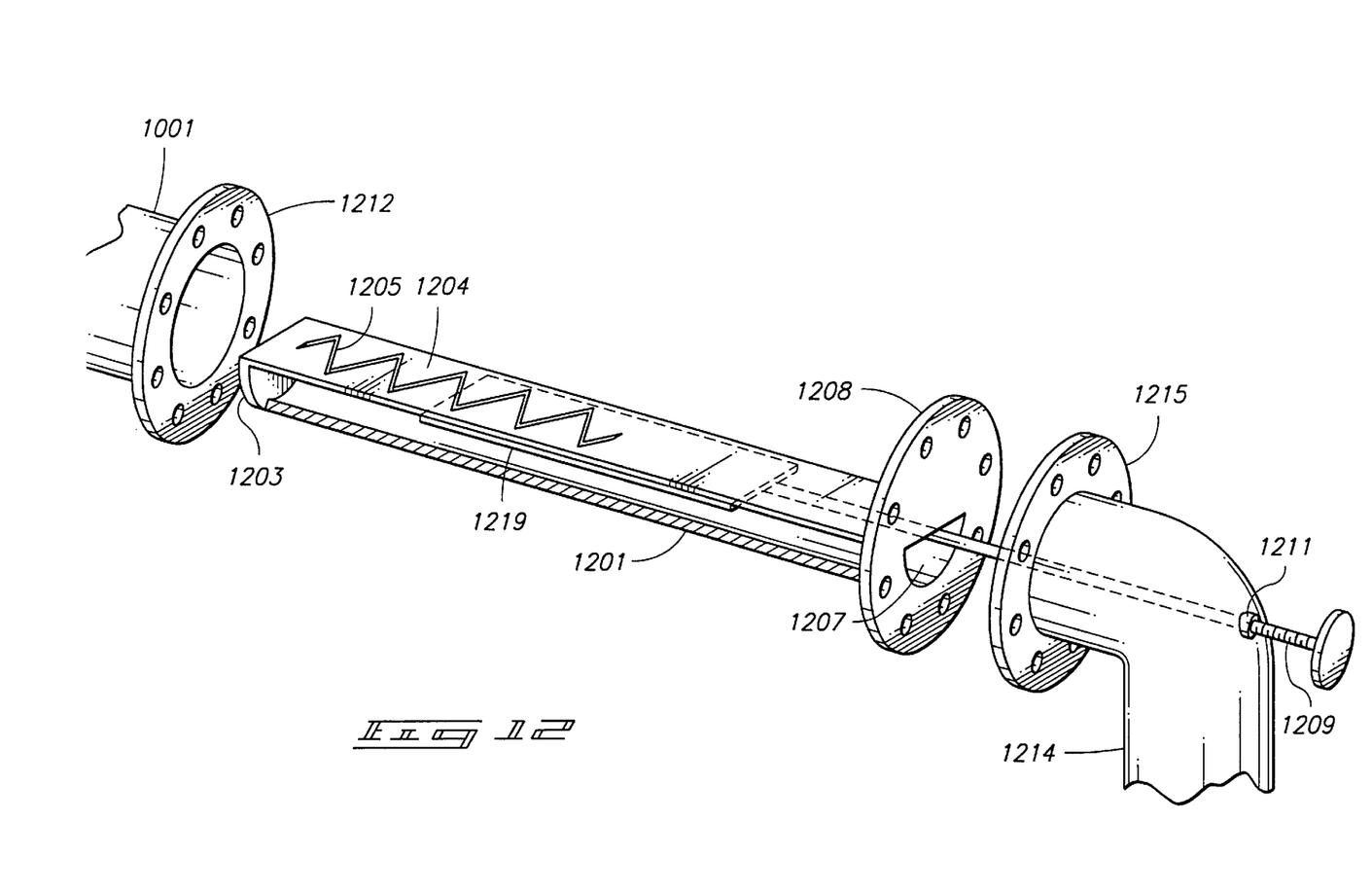
FIG. 12 is an isometric view of a control valve of the type shown in FIG. 5 having a control valve insert inserted into a pipe.

With respect to FIG. 12, a control value insert is shown which makes a control valve of the type shown in FIG. 5. In FIG. 12 a pipe 1001 connected to an elbow (not shown) by a pipe fitting forms the valve housing body. A segment of a cylinder 1201 having straight sides parallel to the axes of the cylinder has a control surface 1204 placed between the parallel sides of the cylindrical segment. The cylindrical segment is closed at the first and with a plate 1203, thus forming a control chamber for the process fluid. Control surface opening 1205 is disposed through control surface 1204. The cylindrical segment is open at the second end 1207. A plate 1219 forming the flow restricter is placed adjacent to the control surface, either immediately on top of it or immediately on the underside within the control chamber. The second end of the control chamber is connected to a pipe fitting 1208, preferably a pipe flange. A moveable drive stem 1209 is connected to the flow restricter. The drive stem protrudes through a modified piping elbow 1214 at opening 1211. The control valve insert is inserted into pipe 1001 such that control valve pipe fitting 1208 mates with pipe fitting 1212. The modified elbow 1214 is then placed adjacent to the control valve insert fitting 1208 such that the elbow fitting 1215 is coupleable to the control valve fitting 1208. Fittings 1215, 1208, and 1212 are then coupled thus forming a control valve of the type described herein. Fluid will flow into elbow 1214 and into the first portion of the control valve through opening 1207, the first portion being the chamber formed by the cylindrical segment and the control surface 1204. Fluid will then flow out through opening 1205 into the second portion of the control valve, the second portion being the interior of the pipe 1001. Flow is restricted by moving flow restricter 1219 across opening 1205 by valve actuator 1209. It should be noted that fluid entering the cylindrical segment makes a single 90° turn as it passes from the first portion into the opening 1205, and makes only one further 90° turn as it exits opening 1205 and enters the second portion of the control valve comprising the interior of pipe 1009, before heading downstream.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A fluid control valve comprising:
   a valve housing defining a void and having a first housing opening and a second housing opening, the valve housing void defining a valve control length;
   a sleeve disposed within said void, said sleeve having a first side and a second side, said first side being in fluid communication with said housing first opening thereby forming a first fluid passageway therebetween, said second side being in fluid communication with said second housing opening thereby forming a second fluid passageway therebetween, said sleeve having at least one sleeve opening disposed within said control length between the first side and the second side to enable fluid to be communicated therebetween;
   a flow restricter for progressively blocking off said at least one sleeve opening for controlling the amount of fluid passing therethrough at any given time; and
   said first fluid passageway having no more than one ninety degree turn between said first housing opening and said first sleeve side, said second fluid passageway having no more than one ninety degree turn between said second housing opening and said second sleeve side,
   wherein one of said fluid passageways produces a change in flow direction.

2. The fluid control valve of claim 1 wherein said control length is longer than a maximum cross-sectional dimension of the first housing opening and the second housing opening.

3. The fluid control valve of claim 1 wherein said at least one sleeve opening has a cross sectional area equal to the larger of said first housing opening and said second housing opening.

4. The fluid control valve of claim 1 wherein said sleeve comprises a first sleeve further defined as having a first surface and a second surface, and the flow restricter comprises a second sleeve slidably disposed about the first surface of the first sleeve, said second sleeve being movable over said control length.

5. The fluid control valve of claim 1 wherein said sleeve comprises a first sleeve further defined as having a first surface and a second surface, and the flow restricter comprises a second sleeve slidably disposed about the second surface of the first sleeve, said second sleeve being movable over said control length.

6. The fluid control valve of claim 1 wherein said sleeve comprises a cylinder and said sleeve opening defines a helical path within said sleeve.

7. The fluid control valve of claim 1 wherein said sleeve comprises a cylinder and said at least one sleeve opening comprises a series of holes within said sleeve, said holes being disposed in a helical pattern about said sleeve.

8. The fluid control valve of claim 7 wherein said holes are of the same diameter.

9. The fluid control valve of claim 7 wherein said holes have a plurality of different diameters.

10. The fluid control valve of claim 1 wherein said flow restricter comprises a second sleeve, said first sleeve having threads disposed thereabout on at least one surface of said first sleeve, said second sleeve also having threads disposed thereabout on at least one surface thereof and being configured to engage said threads on said first sleeve, one of said sleeves being rotatably movable with respect to the other sleeve, wherein said rotatably movable sleeve is connected to a rotatable drive stem extending from said valve housing.

11. The fluid control valve of claim 1 wherein said sleeve is movable with respect to said valve housing, said sleeve being connected to a movable drive stem extending from said valve housing.

12. The fluid control valve of claim 1 wherein said sleeve is fixed with respect to said valve housing, and said flow restricter is responsive to input from a movable drive stem extending from said valve housing.

13. The fluid control valve of claim 12 wherein:
said valve housing comprises a section of pipe having an inside radius, said pipe terminating at a first pipe fitting; and
said first sleeve comprises a cylinder having a first closed end and a second open end connected to a second pipe fitting, said second pipe fitting coupleable with said first pipe fitting such that when said first pipe fitting and said second pipe fitting are coupled said first sleeve is disposed within said pipe section, thereby forming said void.

14. A fluid control valve comprising:
a valve housing defining a void and having a first housing opening and a second housing opening, the valve housing void defining a valve control length;
a sleeve disposed within said void, said sleeve having a first side and a second side, said first side being in fluid communication with said housing first opening thereby forming a first fluid passageway therebetween, said second side being in fluid communication with said second housing opening thereby forming a second fluid passageway therebetween, said sleeve having at least one sleeve opening disposed within said control length to enable fluid to be communicated therethrough;
a flow restricter for progressively blocking off said at least one sleeve opening for controlling an amount of fluid passing through said at least one opening at any given time; and
said first fluid passageway forming a substantially straight flow path between said first housing opening and said first sleeve side, said second fluid passageway having no more than one ninety degree turn between said second housing opening and said second sleeve side.

15. A fluid control valve comprising:
a valve housing defining a void and having a first opening and a second opening therethrough, the valve housing void defining a control length;
a planar control surface disposed within said void bifurcating said void into two portions, each portion being in fluid communication with one of said first and second openings, said control surface having at least one control surface opening disposed therethrough to allow fluid to be communicated between said two portions thereby forming the fluid passageways, each fluid passageway being formed between one of said openings and the at least one control surface opening, the at least one control surface opening being received within the control length of the valve housing void; and
a flow restricter for progressively blocking off said at least one control surface opening to control the amount of fluid passing therethrough at any given time,
wherein one of said fluid passageways produces a change in flow direction.

16. The fluid control valve of claim 15 wherein said flow restricter comprises a control plate slidably mounted adjacent to said control surface and movable over said control length.

17. The fluid control valve of claim 15 wherein said planar surface is contoured.

18. The fluid control valve of claim 17 wherein said valve housing comprises a cylinder having an inner surface and wherein said planar control surface comprises an arcuate surface bounded by four edges, said arcuate surface contacting the inner surface of said valve housing along two opposing edges of said surface.

19. The fluid control valve of claim 15 wherein said valve housing comprises a cylinder and said planar control surface is a flat planar surface.

20. The fluid control valve of claim 15 wherein said valve housing comprises a cylinder having a central axis and an inner surface, said control surface further comprising a second planar surface, said first and second planar surfaces being flat planar surfaces intersecting along a common line parallel to the axis of said cylinder and extending from said common line to the inner surface of said valve housing.

21. The fluid control valve of claim 19 wherein:
said at least one control surface opening comprises a first control opening and a second control opening, said first and second control openings being of different sizes; and
said flow restricter comprises a first control plate and a second control plate, said first control plate being slidably mounted adjacent to said first control opening, said second control plate being slidably mounted adjacent to said second control opening.

22. The fluid control valve of claim 19 wherein:
said valve housing has a first end and a second end;
said fluid control valve further comprises a second control opening disposed within said first end of said valve housing and a second flow restricter for progressively blocking off said second control opening;
said flow restricter comprises a control plate slidably mounted adjacent to said control surface and movable over said control length; and
said second flow restricter comprises a second control plate slidably mounted over said second opening.

23. The fluid control valve of claim 15 wherein:
said valve housing comprises a section of a pipe having an inside radius, said pipe terminating at a first pipe fitting:
said planar control surface has a first edge and a second edge, said control surface first edge in contact with a first edge of a cylindrical segment, said control surface second edge in contact with a second edge of said cylindrical segment, said cylindrical segment having a first closed end and a second open end and an outside radius approximately equivalent to said inside radius of said pipe, such that said control surface and said cylindrical segment may be inserted into said pipe; and
a second pipe fitting connected to said cylindrical segment second end, said second pipe fitting coupleable to said first pipe fitting such that when said first pipe fitting and said second pipe fitting are coupled said cylindrical segment is disposed within said pipe section.

* * * * *